(12) United States Patent
Harper (10) Patent No.: US 11,344,031 B2
(45) Date of Patent: May 31, 2022

(54) ACARICIDES

(71) Applicant: Evolution Biotechnologies Ltd, Sharnbrook (GB)

(72) Inventor: David R. Harper, Sharnbrook (GB)

(73) Assignee: Evolution Biotechnologies Ltd., Sharnbrook (GB)

( * ) Notice: Subject to any disclaimer, the term of this patent is extended or adjusted under 35 U.S.C. 154(b) by 0 days.

(21) Appl. No.: 15/750,474

(22) PCT Filed: Aug. 8, 2016

(86) PCT No.: PCT/GB2016/052455
§ 371 (c)(1),
(2) Date: Feb. 5, 2018

(87) PCT Pub. No.: WO2017/025732
PCT Pub. Date: Feb. 16, 2017

(65) Prior Publication Data
US 2018/0235237 A1    Aug. 23, 2018

(30) Foreign Application Priority Data
Aug. 7, 2015 (GB) ..................... 1513981

(51) Int. Cl.
| | | |
|---|---|---|
| A01N 63/40 | (2020.01) | |
| A01N 63/30 | (2020.01) | |
| A01N 63/20 | (2020.01) | |
| A01N 25/00 | (2006.01) | |
| A01N 25/28 | (2006.01) | |

(52) U.S. Cl.
CPC ........... *A01N 63/30* (2020.01); *A01N 25/006* (2013.01); *A01N 25/28* (2013.01); *A01N 63/20* (2020.01); *A01N 63/40* (2020.01)

(58) Field of Classification Search
None
See application file for complete search history.

(56) References Cited

U.S. PATENT DOCUMENTS

| | | | |
|---|---|---|---|
| 5,350,576 A | 9/1994 | Payne et al. | |
| 2009/0060880 A1* | 3/2009 | Meikle | C12N 1/14 424/93.5 |
| 2013/0195945 A1 | 8/2013 | Jenkins et al. | |

FOREIGN PATENT DOCUMENTS

| | | | | |
|---|---|---|---|---|
| WO | 95/25430 A1 | 9/1995 | | |
| WO | WO-9525430 A1 * | 9/1995 | ............. | A01N 63/30 |
| WO | 2008/062413 A2 | 5/2008 | | |
| WO | 2015/055752 A1 | 4/2015 | | |

OTHER PUBLICATIONS

Lekimme, M. et al. 2006. In vitro entomopathogenic activity of *Beauveria bassiana* against *Psoroptes* spp. (Acari: Psoroptidae). Veterinary Parasitology 139: 196-202. specif. pp. 196, 197.*
Van de Lustgraaf, B. 1978. Ecological relationships between xerophilic fungi and house-dust mites (Acarida: Pyroglyphidae). Oecologia 33: 351-359. specif. pp. 351, 352.*
Hallsworth, J.E. et al. 1994. Effect of carbohydrate type and concentration on polyhydroxyl alcohol and trehalose content of conidia of three entomopathogenic fungi. Microbiology 140: 2705-2713. specif. pp. 2705, 2706, 2711, 2712.*
Lekimme, M. et al. 2008. Pathogenicity and thermotolerance of entomopathogenic fungi for the control of the scab mite, *Psoroptes ovis*. Experimental and Applied Acarology 46(1-4): 95-104. specif. pp. 96, 98.*
Van Asselt, L. 1999. Interactions between domestic mites and fungi. Indoor-Built Environment 8: 216-220. specif. pp. 216, 217.*
Jeromin, A.M. 2010. Discuss facts, fallacies of dust mite allergies. Datasheet [online]. Retrieved on May 13, 2020. Downloaded from the internet at: <https://www.dvm360.com/view/discuss-facts-fallacies-dust-mite-allergies> pp. 1-4. specif. p. 1.*
De Saint Georges-Gridelet, D. 1988. Optimal efficacy of fungicide preparation, natamycin, in the control of the house-dust mite, *Dermatophagoides pteronyssinus*. Experimental & Applied Acarology 4: 63-72. specif. p. 71.*
Stoeckli, M.R. et al. 2013. The effect of Psoroptes ovis infestation on ovine epidermal barrier function. Veterinary Research 44: 1-11. specif. p. 1.*
Hart, B.J. 1998. Life cycle and reproduction of house-dust mites: environmental factors influencing mite populations. Allergy 53 (Suppl. 48): 13-17. specif. p. 14.*
Saleh, S.M. et al. 1991. Control of European house dust mite *Dermatoophagoides pteronyssinus* (Trouessart) with *Bacillus* spp. Acarologia XXXIII (3): 257-260. specif. p. 257.*
Li, Z. et al. 2010. Biological control of insects in Brazil and China: history, current programs and reasons for their successes using entomopathogenic fungi. Biocontrol Science and Technology 20(2): 117-136. specif. pp. 124, 129, 130.*
Flowers, J. 2013. The hidden health dangers of dust mites. Datasheet [online]. Retrieved on Feb. 1, 2021. Downloaded from the internet: <https://learn.allergyandair.com/health-dangers-of-dust-mites/> p. 1.*
Denning, D.W. et al. 2006. The link between fungi and severe asthma: a summary of the evidence. European Respiratory Journal 27: 615-626; specif. p. 615.*

(Continued)

*Primary Examiner* — Olivia M. Wise
*Assistant Examiner* — Sharon M. Papciak
(74) *Attorney, Agent, or Firm* — Christensen O'Connor Johnson Kindness PLLC (57) ABSTRACT

The present invention relates to a method of treating or preventing a house dust mite infestation, said method comprising applying an acaricidal infectious agent at a site of a house dust mite infestation, or at a site proximal thereto, or at a site at risk of such infestation. Also encompassed are uses of acaricidal infectious agents, methods of isolating acaricidal infectious agents, acaricidal infectious agents obtainable by said methods, acaricidal infectious agent formulations, foodstuffs and mite attractants comprising the same.

7 Claims, 2 Drawing Sheets

(56) References Cited

OTHER PUBLICATIONS

Caldwell, B., et al., "Resource Guide for Organic Insect and Disease Management," © 2013, 2d ed., New York State Agricultural Experiment Station, Cornell University, Geneva, N.Y., 210 pages.

International Preliminary Report on Patentability dated Oct. 19, 2017, issued in International Application No. PCT/GB2016/052455, filed Aug. 8, 2016, 14 pages.

International Search Report and Written Opinion dated Nov. 28, 2016, issued in corresponding International Application No. PCT/GB2016/052455, filed Aug. 8, 2016, 16 pages.

Oliveira, D.G.P., et al., "Advances and Perspectives of the Use of the Entomopathogenic Fungi *Beauveria bassiana* and *Metarhizium anisopliae* for the Control of Arthropod Pests in Poultry Production," Brazilian Journal of Poultry Science 16(1):1-12, Jan.-Mar. 2014.

Saleh, S.M., et al., "Control of European House Dust Mite *Dermatophagoides pteronyssinus* (Trouessart) With *Bacillus* spp.," Acarologia 32(3):257-260, 1991.

Second Written Opinion of the International Preliminary Examination Authority dated Jul. 4, 2017, issued in corresponding International Application No. PCT/GB2016/052455, filed Aug. 8, 2016, 5 pages.

Van Der Geest, L.P.S., et al., "Diseases of Mites," Experimental and Applied Acarology 24(7):497-560, Jul. 2000.

Reply to Second Written Opinion dated Aug. 18, 2017, filed in corresponding International Application No. PCT/GB2016/052455, 11 pages.

Database Biosis [Online], Biosciences Information Service, Philadelphia, Aug. 2002, (Aug. 2002), Bextine, B., et al., Field Applications of Bait-Formulated Beauveria bassiana Alginate Pellets for Biological Control of the Red Imported Fire Ant (Hymenoptera: Formicidae), Database Accession No. PREV200300044325 (abstract); and Enviommental Entomology 31(4):746-752, Aug. 2002.

Extended European Search Report dated Mar. 22, 2019, issued in corresponding European Application No. 19153733.1, filed Aug. 8, 2016, 12 pages.

Geden, C.J., et al., "Virulence of Different Isolates and Formulations of Beauveria bassiana for House Flies and the Parasitoid *Muscidifurax raptor*," Biological Control 5:615-621, Dec. 1995.

Mishra, S., et al., "Preparation, Characterization, and Insecticidal Activity Evaluation of Three Different Formulations at Beauveria bassiana Against *Musca domestica*," Parasitology Research 112(10):3485-3495, Oct. 2013.

Australian Examination Report dated Apr. 29, 2020, issued in corresponding Application No. 2016305553, filed Aug. 8, 2016, 5 pages.

Japanese Notice of Reasons for Rejection dated Jun. 1, 2020, issued in corresponding Application No. 2018-525822, filed Aug. 8, 2016, 9 pages.

Second Australian Examination Report dated Aug. 25, 2020 issued in corresponding Application No. 2016305553, filed Aug. 8, 2016, 4 pages.

Third Australian Examination Report dated Nov. 19, 2020 issued in corresponding Application No. 2016305553, filed Aug. 8, 2016, 5 pages.

Fourth Australian Examination Report dated Feb. 4, 2021 issued in corresponding Application No. 2016305553, filed Aug. 8, 2016, 5 pages.

\* cited by examiner

FIGURE 1

Cultures of 25 mites, treated with 25,000 spores (low dose) or 22,500,000 spores (high dose) of known insecticidal fungi

ACARICIDES

The present invention relates to acaricidal infectious agents, and their use in house dust mite control.

The taxonomic class Arachnida embraces a diverse range of arthropods, such as mites (order Acariformes) and spiders (order Araneae).

Asthma is a chronic disease caused by allergic reactions and irritation within the respiratory system. House dust mites are universally recognised as a major cause of asthma, for both sensitisation and in triggering acute attacks. The actual cause is proteins present in the faeces of the house dust mite, which stimulate an allergic response (allergens). Between 50% and 90% of asthmatics who react to airborne material are sensitive to said proteins, and in one British study 10% of the general population reacted to mite allergens. Sensitisation to this material occurs in childhood, probably between three and six months of age, but asthma is lifelong, with further exposure triggering attacks with significant levels of respiratory distress and frequent hospitalisation. House dust mites are typically small, with adults being approximately 0.3 mm in length. One gram of dust may contain up to 500 mites, while a mattress can hold more than two million. The amount of mite material present usually increases with age. One tenth of the weight of a six-year old pillow can consist of mites and mite debris. In a carpet, there will typically be between 1,000 and 10,000 mites per square metre. In the three months of her life, a female mite will lay 25-50 eggs. Despite the many areas affected, usually two mites are responsible for the bulk of the problem. These are *Dermatophagoides pteronyssinus* (predominantly in Europe) and *Dermatophagoides farinae* (predominantly in America). Among other house dust mites, *Euroglyphus maynei* is the most significant.

The primary allergens from *Dermatophagoides* mites are the Der proteins present in mite faeces, and an average mite will produce 20 faeces each day of its life: twice its own body weight. Both mites and faeces are very difficult to remove, and any mechanical attempt to remove the faeces will break many of them up, with the resulting fine allergenic dust distributed by air movement. Storage mites, of which there are over 150 species, typically live on foodstuffs such as grains rather than materials of human origin. Storage mites are taxonomically distinct from house dust mites.

Asthma is a huge and expanding problem in the industrialised nations of the world and is an emerging disease in developing nations. It has been calculated that 8% of the population of the major industrialised nations suffers from asthma, although figures from the US Centers for Disease Control (CDC) are even higher. Of those, approximately one fifth will have severe asthma requiring frequent hospitalisation. Worldwide, according to the 2014 Global Asthma Report, more than a third of a billion people suffer from asthma.

House dust mite infestation is a worldwide problem. Since dust mites require humidity above 50%, some regions are not as affected, including most of the western United States. Those areas which have sufficient natural humidity include the eastern half of the United States (and major western coastal cities), populous areas of Canada, almost all of western Europe, Japan, Korea, and coastal areas of South America, Australia and South Africa. Despite this, levels of house dust mite allergen reactivity are high in other areas. For example, Kuwait is reported as showing very high levels, and data show that death rates from asthma in Kuwait are extremely high. This reflects the fact that when humans make indoor environments comfortable for themselves (with soft furnishings and humidifiers, for example), they make that same environment suitable for dust mites. Thus, worldwide levels of house dust mite infestation are even higher than levels of natural humidity would indicate.

Almost two hundred million Americans live in areas severely affected by house dust mite infestation. The cost of asthma within the United States has been calculated as more than $12 billion (over £9 billion) per year. Figures for Europe are even higher. A Canadian study estimated the costs of asthma as averaging £21 per year for every member of the population of the major industrialised nations. 2,000 people every year will die as a result of asthma in the United Kingdom alone, and a quarter of a million worldwide.

In spite of the above, no universally effective method of reducing house dust mite numbers exists, meaning that while it is possible to modify the human environment to reduce house dust mite numbers, this requires concerted use of multiple approaches and complex and demanding changes to lifestyle. Thus there is an unmet need for a broad-acting house dust mite control strategy applicable to multiple settings.

The most commonly used methods and their limitations are as follows:

Washing infested material at temperatures above 55° C. will kill mites, but is impractical for many of the favoured locations for mites, such as carpets, mattresses, and soft furnishings. Steam cleaning is possible for some carpets and other surfaces, but this is very labour intensive. In neither case is there any barrier to immediate recolonisation from nearby sources of mites.

Rigorous vacuum cleaning is often used in an attempt to reduce the amount of mite faeces present, but is generally ineffective, reducing the amount of allergen present by only 5-10% and having very little effect on live mites. In addition, vacuuming requires the use of machines equipped with HEPA filters if the allergenic dust is not to be released, and machines with such filters are expensive to buy and maintain, with regular costs for filter replacement if these are to remain effective. Even if such a machine is used, the physical action of cleaning may stir up allergen-loaded dust and so increase exposure.

Filtering or dehumidifying room air is possible, but in a standard domestic setting the reintroduction of allergens or humidity from outside is both frequent and almost impossible to prevent.

Barrier methods that block the access of mites to mattresses and bedding are in common use, but are also of limited value. First, no such method can be used on carpets and most soft furnishings and toys, which are a major source of exposure to allergens. Secondly, such methods are expensive, and again require regular replacement if an effective barrier is to be maintained. Despite this they are often cited as the best available option.

Denaturing sprays intended to inactivate the allergen in carpets or on surfaces are also available. However, they require frequent re-application and are of limited value.

Conventional acaricides are chemical agents and include pesticides such as organophosphates and carbamates. However, many such pesticides have been subject to adverse review by government and regulatory authorities. One major chemical acaricide (Acarosan) was withdrawn worldwide after being found to potentiate asthma, while Bendiocarb, a pesticide formerly used for this purpose in the United Kingdom was noted as causing "rapid poisoning" of humans. Multiple adverse effects are listed for Bendiocarb in available toxicology data sheets, and it is noted that asthmatics are at particular risk. More recently, acaricides such as the neonicotinoids have been associated with adverse effects on the environment and wildlife and again are subject to an increasing number of restrictions.

Chemical acaricides are of very limited value in treating furniture or other padded items, which are a major source of dust mites, due to limited penetration. This leaves anoxic fumigation (requiring several weeks at a high cost per item as the only available option). In addition, work with other mites, notably storage mites in grain, shows that resistance to chemical pesticides develops rapidly and can become total at acceptable dose levels.

Despite the need for improved control of house dust mites, no current control method is adequate or applicable across the range of colonised locations. The present invention solves one or more of the above-identified problems.

According to one aspect the invention provides a method of treating or preventing a house dust mite infestation, said method comprising applying an acaricidal infectious agent at a site of a house dust mite infestation or at a site proximal thereto or at a site at risk of such infestation. In a related aspect the invention provides a method of treating or preventing a house dust mite infestation, said method comprising applying an acaricidal infectious agent at a site of a house dust mite infestation or at a site proximal thereto. Said method embraces corresponding use of an acaricidal infectious agent for treating or preventing a house dust mite infestation.

In a related aspect there is provided use of an acaricidal infectious agent for preventing an increase in the concentration of a house dust mite-derived allergen. In use, said acaricidal infectious agent is, for example, applied in a domestic, industrial, agricultural or medical setting/environment. Said use embraces a corresponding method for preventing an increase in the concentration of a house dust mite-derived allergen.

A further aspect of the invention provides use of an acaricidal infectious agent for preventing or treating a condition (e.g. including but not limited to asthma, allergic rhinitis, dermatitis, eczema or combinations thereof) caused or exacerbated by a house dust mite-derived allergen. In use, said acaricidal infectious agent is, for example, applied in a domestic, industrial, agricultural or medical setting/environment. Said use embraces a corresponding method for preventing or treating a condition caused or exacerbated by a house dust mite-derived allergen.

In another aspect there is provided use of an acaricidal infectious agent for preventing or reducing sensitisation of a subject to a house dust mite-derived allergen. In use, said acaricidal infectious agent is, for example, applied in a domestic, industrial, agricultural or medical setting/environment. Said use embraces a corresponding method for preventing or reducing sensitisation in a subject to house dust mite-derived allergen.

The acaricidal infectious agent of the invention is typically employed as a dry formulation or a liquid formulation. By way of example, the acaricidal infectious agent may be admixed with a foodstuff (e.g. a mite foodstuff such as liver flakes, pet food, yeast and/or flour, a mite, a mite material, or a dead mite carcass) or a mite attractant (e.g. an aromatic agent, a chemical attractant, or combinations thereof) or said foodstuff or mite attractant may comprise an acaricidal infectious agent. In use, the acaricidal infectious agent may be coated with or dispersed within a foodstuff and/or mite attractant, for example in the form of a bait (e.g. a dry bait). Said foodstuff and/or mite attractant is particularly advantageous when used to treat a mite infestation. The term "foodstuff" as used herein means a substance for consumption by mites. Said foodstuff may be in a form which is ready for consumption. In one embodiment a foodstuff is a mite, a mite material, a mite carcass or combinations thereof (e.g. whole or in a powdered, pulverised and/or homogenised form).

The present inventor has developed a novel approach to the control of house dust mites. This is based on the identification, cultivation, optimisation and development of acaricidal infectious agents, and their use for establishing a transmissible infection (agent replication) in or on a house dust mite with the consequent production of acaricidal effects on said house dust mite.

An "acaricidal infectious agent" as used herein refers to an acaricidal agent that is capable of killing one or more house dust mite by infecting and/or colonising said house dust mite. An acaricidal infectious agent is capable of being transmitted from a first mite (e.g. a candidate mite) to a second mite (e.g. a target mite). This is a particularly advantageous technical effect as it facilitates 'spread' of the acaricidal agent, both in terms of geography (target area) and in terms of efficacy (potential exposure to an entire house dust mite population). In some embodiments an acaricidal infectious agent infects and/or colonises more than one house dust mite genus or species. In another embodiment an acaricidal infectious agent may infect and/or colonise only one house dust mite genus or species. Accordingly, the present invention employs a unique class of house dust mite acaricidal infectious agent that is both structurally and functionally distinct from conventional acaricidal agents (e.g. chemical agents, and toxins from bacteria such as *Bacillus thuringiensis* or *B. sphaericus*), the latter being incapable of infection and replication in or on a house dust mite. Accordingly, non-transmissible agents acting via toxin uptake such as *B. thuringiensis* and the toxins of related *Bacillus* species are excluded from the invention.

In some embodiments, an acaricidal infectious agent may be subjected to further optimisation. In one embodiment the acaricidal infectious agent is selectively bred and/or mutagenized to provide a variant acaricidal infectious agent having improved efficacy and/or which counters adaptation and/or resistance in mites. Thus, in one embodiment the term "acaricidal infectious agent" encompasses both acaricidal infectious agents and variant acaricidal infectious agents.

In one embodiment, an acaricidal infectious agent comprises (or consists of) a virus, a bacterium, a fungus, a protozoan, or a combination thereof.

In one embodiment an acaricidal infectious agent is a bacterium. In one embodiment the acaricidal infectious agent is a virus, for example a virus of the family Baculoviridae. In another embodiment an acaricidal infectious agent is a fungus, for example a fungus of the genus *Beauveria* or *Microspora*. In a further embodiment an acaricidal infectious agent is a protozoan.

In one embodiment multicellular agents such as parasitoids (defined as insects that lay their eggs inside or on a specific host, from which larvae hatch that then kill the host) or predators of mites are excluded from the current invention.

The present invention also provides a method for isolating an acaricidal infectious agent comprising:
   a. forming an admixture by admixing:
      i. a candidate house dust mite or an extract thereof wherein said candidate house dust mite or extract is provided from a test sample; and ii. a target house dust mite or cell culture thereof;
b. monitoring said target house dust mite or cell culture thereof for the presence or absence of an adverse pathological change; and
c. wherein, when the presence of an adverse pathological change is observed, isolating an acaricidal infectious agent from said admixture or test sample or from a component thereof.

The present invention further provides an acaricidal infectious agent obtainable (e.g. obtained) by the above method.

In one embodiment, when monitoring fails to identify a pathological change, the method steps a. and b. are repeated with a different candidate house dust mite (i.e. from a different test sample). This sequence may be repeated iteratively until an adverse pathological change is observed.

In one embodiment, when an adverse pathological change is observed, the target house dust mite or cell culture thereof may be reintroduced/subcultured to a fresh supply of the same target house dust mite or cell culture thereof and the fresh target house dust mite or cell culture thereof monitored for the presence of an (the same) adverse pathological change thereby providing confirmation of the transmissible/infectious nature of the identified acaricidal agent.

Reference to an admixture/test sample "component thereof" as used herein embraces a corresponding fraction, aliquot, extract, portion, share, constituent and/or segment thereof.

The term "candidate mite" as used herein refers to a mite that is infected with an acaricidal infectious agent as defined herein, or is suspected of being infected with said acaricidal infectious agent.

In some embodiments, the skilled person may perform a pre-selection step to improve the probability that a mite selected as a "candidate mite" is infected with an acaricidal infectious agent. Such a step may suitably be employed when a candidate mite is selected from a collapsed colony for testing with a target mite or cell culture thereof (see Example 4). The pre-selection may be performed by screening a "candidate mite" for the presence of an acaricidal infectious agent. Any screening method may be employed. For example, a "candidate mite" may be selected on the basis of an adverse pathological change in the mite when compared to a healthy mite of the same genus and/or species. In one embodiment, the adverse pathological change is a visual change, monitored for example using microscopy.

In one embodiment, an adverse pathological change causes an adverse effect on the vitality of the house dust mite. Corresponding phenotypic traits include a change in colour, a change in the cuticle and a bloated appearance prior to and/or after death, a change in size, activity or developmental times, extended or rigid legs, the presence of spores as a dusty appearance on the outside of a dead mite or combinations thereof. Said adverse pathological change may be monitored by any one of the following observations:
changes in colour: a darkening or complete colour change in the dead mite;
changes in the cuticle and a bloated appearance prior to and/or after death;
dead mites attached to the substrate by the anus or mouthparts;
dead mites are flaccid and/or full of liquid that is exuded from the anus;
legs are extended and rigid rather than curled under the body;
spores are present as a dusty appearance on the outside of the dead mite but which are distinct from decay agents colonising the mite body only after death;
changes in size, or activity or developmental times; and/or
changes in a marker, such as a target mite protein or nucleic acid marker.

Alternatively or additionally, an adverse pathological change may be monitored by immunological detection means and/or nucleic acid-based detection means.

In some embodiments a target mite cell culture may be employed instead of a target mite. Use of a target mite cell culture may be particularly advantageous for detecting a viral acaricidal infectious agent. Accordingly, an adverse pathological change may be monitored by any one or more of the following observations: target mite cell death, visible cytopathic effects (e.g. cell rounding, clear zones, plaque formation, or combinations thereof), differential staining of adversely effected cells (suitably using vital stains, such as crystal violet and/or neutral red), microscopy (e.g. electron microscopy), or combinations thereof.

In one embodiment a "candidate house dust mite" is a live mite. In another embodiment the "candidate house dust mite" is a dead mite.

In some embodiments an extract of a candidate house dust mite is used. An "extract" of a candidate house dust mite as used herein refers to a product obtainable (e.g. obtained) by applying one or more processing steps to a live and/or a dead mite. As such, house dust mites may be absent from said extract. In one embodiment an extract of a candidate house dust mite is obtainable (e.g. obtained) by homogenising one or more live and/or dead mite(s).

A candidate house dust mite or an extract thereof may be obtained from any suitable test sample. For example, in one embodiment the test sample is an environmental test sample, which may be from a habitat of said candidate house dust mite. The skilled person can obtain an environmental test sample for use in accordance with the present invention using knowledge of mite habitats. House dust mites live in locations proximal to human habitation and obtain their primary nutrient source from human-derived material. A test sample may be a dust sample from a domestic, agricultural, or medical environment/setting or a collapsed house dust mite colony. Thus, in one embodiment an environmental test sample is obtained from carpet, bedding, pillow, curtain, upholstery, furniture, skin, animal fur, animal bedding, foodstuff, house dust mite faeces or combinations thereof. Suitably an environmental (e.g. agricultural) test sample may be dust, dirt, soil or a combination thereof.

Referring to the method of the invention for isolating an acaricidal infectious agent, a candidate house dust mite or an extract thereof is admixed with a target house dust mite or a cell culture thereof. Suitably a candidate house dust mite may be admixed with a target house dust mite.

The term "target house dust mite or cell culture thereof" as used herein refers to a healthy mite or cell culture thereof, i.e. a house dust mite or a cell culture thereof that is not infected with an acaricidal infectious agent. In one embodiment the target house dust mite or cell culture thereof is a mite colony or a mite cell culture that has been propagated in laboratory conditions. In one embodiment a cell culture of a target mite refers to an in vitro culture of cells.

In one embodiment a target house dust mite or cell culture thereof and a candidate house dust mite or extract thereof is of the same mite genus and/or species. Alternatively, cross-species testing may be employed (see Example 4).

The method for isolating an acaricidal infectious agent comprises monitoring a target house dust mite or cell culture thereof for the presence or absence of an adverse pathological change. Preferably, the method comprises monitoring the presence of an adverse pathological change. Once the presence of an adverse pathological change to the target house dust mite or cell culture thereof has been successfully observed (thus indicating the presence of an acaricidal infectious agent) said acaricidal infectious agent is isolated from the admixture (or from a component thereof) or from the test sample (or from a component thereof). The adverse pathological change may be one or more of the pathological changes described in foregoing embodiments.

In one embodiment there is provided an isolated acaricidal infectious agent. The term "isolating" as used herein means separating an acaricidal infectious agent from one or more contaminants (e.g. from a mite carcass and/or from an allergen). An acaricidal infectious agent of the present invention is provided in a form for use that contains an effective amount of said agent.

In one embodiment an acaricidal infectious agent is cultured in vitro. In said embodiment the acaricidal infectious agent may suitably be isolated from one or more constituent(s) present in the culture media (for example, any allergen present).

In one embodiment a house dust mite is selected from the following genera *Dermatophagoides, Euroglyphus* or combinations thereof. Suitably, a house dust mite may be a *Dermatophagoides* species selected from *Dermatophagoides pteronissynus, Dermatophagoides farinae, Dermatophagoides microceras* and *Dermatophagoides siboney*, or combinations thereof. In another embodiment the house dust mite may be *Euroglyphus maynei*.

An acaricidal infectious agent may be formulated in any suitable manner which increases uptake/contact by a house dust mite. Conventional means may be employed to improve stability of the agent, and said improved stability may be measured by an improved retention of activity over time when compared to the same (or a technically equivalent) acaricidal infectious agent that has not been formulated as per the present invention tested under the same conditions. The agent may also be formulated for slow release over a period of time, for example from a solid matrix or by gradual impregnation into fabrics, filling materials, clothing, bedding or combinations thereof for the prevention or moderation of infestation of those habitats by mites.

In one embodiment, a formulation may contain multiple acaricidal infectious agents to improve the house dust mite target range, for example to include the house dust mite targets *Dermatophagoides pteronissynus, Dermatophagoides farinae, Dermatophagoides microceras, Dermatophagoides siboney, Euroglyphus maynei*, or combinations thereof. Such multiple agent (aka 'panel') formulations are further distinguished from those encountered in natural settings.

In one embodiment, the acaricidal infectious agent(s) is microencapsulated. By way of example, microencapsulation capsules comprising the acaricidal infectious agent(s) typically range in size from about 1 µm to about 1000 µm, suitably from about 1 µm to about 800 µm. Suitable microencapsulation substances include one or more of starch, styrene maleic acid anhydride half ester or combinations thereof.

The precise formulation may vary with the agent in use, and may contain photoprotectant agents, stabilisers, emulsifiers, binders, buffers, anti-desiccants, dispersants and other active ingredients in addition to inert carriers or combinations thereof.

In one embodiment, an acaricidal infectious agent is formulated as a concentrate or as a ready-to-use formulation. A ready-to-use formulation comprising an acaricidal infectious agent may take one or more of the following forms:
  i) a canister or other container suitable for sprinkling or spraying the formulated acaricidal infectious agent onto carpets or other surfaces, preferably onto areas not subject to routine cleaning;
  ii) a container suitable for introduction through a penetrating tube into upholstery or bedding. The acaricidal infectious agent may be formulated so as to be injected by a flow of air or of inert carrier gas from a pressurised container;
  iii) a solid matrix or impregnated into cloth or other materials so designed as to provide release of effective levels of agent over a period of time; and/or
  iv) a food material or an attractant suitable for use with mites. The food material may be presented alongside the mite material or may be used to encapsulate it. This may include presentation with or encapsulation of whole infected mite carcasses.

The use of an acaricidal infectious agent of the invention reduces the house dust mite population at a site of infestation, so as to yield a meaningful reduction in production of house dust mite-derived allergen.

In one embodiment, an acaricidal infectious agent is used to prevent onset of a house dust mite infestation at a site of application (e.g. by "preventing" a house dust mite infestation) or to prevent further population growth of an already-established house dust mite infestation.

The term "infestation" as used herein refers to an unwanted colonisation of an area by house dust mites. In some embodiments the term "infestation" also includes a rapid growth in the population of the mites present at a colonised area.

The term "applying" refers to contacting a house dust mite infestation, or a site proximal thereto or a site at risk of such infestation with an acaricidal infectious agent. Suitably the site proximal thereto or at risk of such infestation is a site having the correct humidity and temperature conditions to support a mite infestation.

Advantageously acaricidal infectious agents of the present invention are (unlike conventional acaricides) particularly suited to application to multiple mite habitats. In one embodiment an acaricidal infectious agent may be applied in a domestic, industrial, agricultural or medical (e.g. a respiratory medicine unit, an allergy clinic, or an asthma clinic) setting/environment. In one embodiment an acaricidal infectious agent may be applied to fabrics, for example bedding (e.g. a pillow interior or a mattress), upholstery, padded furnishings, soft toys, carpets, curtains, filling materials, clothing, soft furnishings or combinations thereof.

An acaricidal infectious agent may be used or applied at any relevant concentration to achieve an acaricidal effect. The relevant concentration may be evaluated for an individual acaricidal infectious agent in a house dust mite colony, e.g. a captive house dust mite colony. A dosage may be calculated so as to initiate a sustainable acaricidal infection and thus miticidal effect across multiple dust mite habitats, an effect not achievable with conventional (e.g. chemical) acaricides.

In one embodiment a plurality of acaricidal infectious agents can be applied in combination, e.g. at least 2, 3, 4 or 5 acaricidal infectious agents can be used.

The acaricidal infectious agent of the invention prevents or reduces sensitisation of a subject to a house dust mite-derived allergen. The term "sensitisation" refers to a process by which a subject develops an allergy to a house dust mite-derived allergen via exposure thereto. Typically, a house dust mite-derived allergen may be present on or in the faeces of a house dust mite and/or on or in biological material released therefrom. In one embodiment, a house dust mite-derived allergen is a Der protein, e.g. a Der protein present in mite faeces or mite material. In one embodiment, a Der protein is Der p 1, Der f 1, Der m 1, Der s 1, Der p 2, Der f 2, Der s 2, Der p 3, Der f 3, Der s 3, Der p 4, Der f 4, Der p 5, Der f 5, Der p 6, Der f 6, Der p 7, Der f 7, Der p 8, Der p 9, Der f 9, Der p 10, Der f 10, Der g 10, Der p 11, Der f 11, Der p 12, Der f 13, Der p 14, Der f 14, Der p 15, Der f 15, Der f 16, Der f 17, Der p 18, Der f 18, Der p 20, Der p 21, Der f 22, Der p 23, Der f 24 or combinations thereof. In another embodiment, a house dust mite-derived allergen is a Eur protein, e.g. a Eur protein present in mite faeces or mite material. In one embodiment, a Eur protein is Eur m 1, Eur m 2, Eur m 3, Eur m 4, Eur m 14 or combinations thereof.

BRIEF DESCRIPTION OF THE DRAWINGS

Embodiments of the invention will now be described, by way of example only, with reference to accompanying drawings, in which.

Unless defined otherwise, all technical and scientific terms used herein have the same meaning as commonly understood by one of ordinary skill in the art to which this disclosure belongs. Singleton, et al., DICTIONARY OF MICROBIOLOGY AND MOLECULAR BIOLOGY, 20 ED., John Wiley and Sons, New York (1994), and Hale & Marham, THE HARPER COLLINS DICTIONARY OF BIOLOGY, Harper Perennial, NY (1991) provide one of skill with a general dictionary of many of the terms used in this disclosure.

This disclosure is not limited by the exemplary methods and materials disclosed herein, and any methods and materials similar or equivalent to those described herein can be used in the practice or testing of embodiments of this disclosure. Numeric ranges are inclusive of the numbers defining the range.

The headings provided herein are not limitations of the various aspects or embodiments of this disclosure which can be had by reference to the specification as a whole. Accordingly, the terms defined immediately below are more fully defined by reference to the specification as a whole.

Other definitions of terms may appear throughout the specification. Before the exemplary embodiments are described in more detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within this disclosure. The upper and lower limits of these smaller ranges may independently be included or excluded in the range, and each range where either, neither or both limits are included in the smaller ranges is also encompassed within this disclosure, subject to any specifically excluded limit in the stated range. Where the stated range includes one or both of the limits, ranges excluding either or both of those included limits are also included in this disclosure.

It must be noted that as used herein and in the appended claims, the singular forms "a", "an", and "the" include plural referents unless the context clearly dictates otherwise. Thus, for example, reference to "an acaricidal infectious agent" includes a plurality of such candidate acaricidal infectious agents and reference to "the isolated acaricidal infectious agent" includes references to one or more isolated acaricidal infectious agents and equivalents thereof known to those skilled in the art, and so forth.

The invention will now be described, by way of example only, with reference to the following Figures and Examples.

EXAMPLES

Materials & Methods

Bioprospecting

Microbiological agents are isolated by a process of bioprospecting. This involves the isolation of naturally occurring agents that can infect the house dust mite. These agents may be viral, bacterial, fungal, or protozoan in nature, and may be isolated from environmental material, from house dust mites or from related species, since infections that cross species ("zoonoses") can often cause more severe infections.

Mites collected from a variety of sources are co-cultured with laboratory-grown mites. Alternatively, material from sources containing mites are homogenized and introduced into the foodstuff of laboratory-grown mite cultures. Laboratory-grown mites are then monitored for the appearance of sickness. Sick mites are isolated and examined for disease pathology, then introduced into fresh cultures which are again monitored for disease-associated effects.

Samples are optimally analysed as follows:

1) Sample Collection and Initial Examination

Samples are obtained from dust from carpets and bedding in houses, preferably those with a previous history of house dust mite infestations or the correct humidity and temperature conditions to support house dust mite infestations. Collection of samples is ideally made using a specially prepared vacuum cleaner with an appropriate filter inserted for mite capture, though other method may be used. Samples are also obtained from other sources rich in mites, in particular animal bedding materials. Samples containing mites may require specific treatments to remove predatory mites (see below).

When the dust sample is received, it is examined under a binocular microscope for any signs of mite activity (mite movement, cast skins, dead mites etc.). Information on the collection date, method of collection and received date as well as the conditions of transport are recorded to aid in determining whether live or dead mites would be expected. All samples that cannot be dealt with immediately are maintained until they can be processed. Enough food is provided to ensure survival of live mites and samples should be held in dishes or containers which are sealed with parafilm. These dishes are placed in a sealable plastic bag with a small piece of damp cotton wool (1 cm$^3$, squeezed to remove excess water) to maintain humidity and the bag placed in an incubator at 25° C.

Samples are then processed by co-cultivation of live mites or by homogenization.

2a) Co-Cultivation

Samples of dust are placed in a coarse sieve (mesh size 2 mm) with a lid on, on top of 14.5 cm piece of filter paper which is placed on a piece of aluminium foil. The foil is wrapped around the sieve and shaken manually using circular motions, taking care not to lift the sieve off the foil, for approximately 30 seconds to separate a fine dust sample from excess hairs and fibres (the coarse dust sample). The fine dust sample is placed into the standard Petri dish set-up. The coarse debris is stored in a plastic screw top jar and sealed with brown parcel tape or a plastic 9cm Petri dish sealed with parafilm. Jars are placed inside a sealable polythene bag and the opening secured with brown parcel tape, Petri dishes in a bag which can also be sealed with parcel tape. This sample may be stored under ambient conditions in the laboratory or under refrigeration at no lower than 4° C., and should never be frozen as this may inactivate many potential biological control agents.

The sieve is washed with a suitable disinfectant and rinsed with alcohol between each sample. Filter paper and foil are discarded between samples. A standard Petri dish set-up is used to maintain all non-homogenised samples that are received into the laboratory for an initial observation period of 7-10 days.

Pieces of filter paper are cut to fit in the lid of an 80 mm glass Petri dish. An individual sample should be placed in the middle of the dish, unless there is too much material in which case a larger 90 mm glass Petri dish is used. The filter paper is humidified by placing 3 drops of water (approx. 30 μl of water) around the edge of the paper. A small amount (approximately 0.01 g) of mixed food is sprinkled on the top of the sample. The mixed food consists of 1:4:2 parts fish food:liver:yeast and flour. This can be made up in advance and kept in the freezer until required. The liver is prepared from desiccated ground liver sieved through a fine mesh sieve. To ensure that this mixed food medium is indeed free from live mites, it is divided into 50 g aliquots and cooled to at least −140° C. for at least 4 h, then stored at −18° C. until required.

The dish is sealed with a wide piece of parafilm and placed in a sealable bag with a 1 cm$^3$ of damp cotton wool. Both the dish and the bag are labeled with the number of the dust sample and placed in an incubator at 25° C.
and/or 2b) Homogenisation Predatory species can prevent reliable assay of pathological effects in laboratory-grown mite cultures. Where the presence of predatory mites or insects is suspected, or where live mites are not present, samples may be homogenised. This serves to remove any predatory mites or other predator species present, as well to maximize recovery of any agents present by disrupting aggregates or cadavers.

Homogenization uses a high-speed mechanical (Wering) blender. The period of homogenisation varies with the nature of the sample, but is typically in the range of 1-5 minutes of total run time. In order to enhance exposure of mites to any agents present, the resultant powder is then mixed with desiccated liver flakes (see above) and the mixture used as part of the foodstuff for mite cultures as noted below.

3) Inoculating Samples with Live Mites

3a) For non-Homogenised Samples

Part of the original dust sample is baited with mites from laboratory stock cultures.

Two replicate cells are set up for each sample. The cell is constructed by fixing a 9 cm piece of filter paper to one side of a cell using adhesive (Pritt stick). The cells should be allowed to dry overnight and the following day, the filter paper should be cut using a sharp scalpel so that it is flush with the edge of the cell. Ensure there is no "lip" on the edge of the filter paper as this may catch when cells are being lifted and checked in desiccators.

A sub-sample of the fine dust is placed in the centre of the cell. Under ×20 magnification, using a binocular microscope, an even layer of dust should just fill the field of view. The remainder of the dust sample is stored in a glass tube (5×2.5 cm soda glass specimen tube) which is stoppered with a non-absorbent cotton wool plug. The tubes are placed in a desiccator over 80% relative humidity (using appropriate potassium hydroxide solution) at 25° C. to maintain any breeding cultures of mites or at a lower temperature for longer storage.

A well is made in the centre of the dust sample in the cell and 30 house dust mite adults of mixed sex from the laboratory cultures using established laboratory strains (e.g. a laboratory strain of *Dermatophagoides pteronissynus*) are placed within it. Mites are transferred using a fine camel hair paintbrush (size 0 with approximately 2-3 hairs left in the brush), and the mites are gently covered with the dust sample. A very small amount of food (0.01 g humidified desiccated liver) is placed on the top of the dust to encourage mites to move through the sub-sample.

3b) For Homogenized Samples

Part of the homogenized powder is mixed with the desiccated liver component of the mite food prior to preparation of the food mixture of 1:4:2 parts fish food:liver:yeast and flour. Under ×20 magnification, using a binocular microscope, an even layer of food/powder mixture should just fill the field of view. The remainder of the dust sample is stored in a glass tube (5×2.5 cm soda glass specimen tube) which is stoppered with a non-absorbent cotton wool plug. The tubes are placed in a desiccator over 80% relative humidity (using appropriate potassium hydroxide solution) at 25° C. to maintain the viability of any agents present, or at a lower temperature for longer storage.

Two replicate cells are set up for each sample. The cell is constructed by fixing a 9 cm piece of filter paper to one side of a cell using adhesive (Pritt stick). The cells should be allowed to dry overnight and the following day, the filter paper should be cut using a sharp scalpel so that it is flush with the edge of the cell. Ensure there is no "lip" on the edge of the filter paper as this may catch when cells are being lifted and checked in desiccators.

A well is made in the centre of the food in the cell and 30 house dust mite adults of mixed sex from the laboratory cultures using established laboratory strains (e.g. a laboratory strain of *Dermatophagoides pteronissynus*) are placed within it. Mites are transferred using a fine camel hair paintbrush (size 0 with approximately 2-3 hairs left in the brush) then gently covered with the food to encourage mites to move through the powder-food mixture.

4) Monitoring

A glass sheet is placed on the top of the cell and secured with two bulldog clips. Cells are placed in desiccators with over 90% relative humidity (using appropriate potassium hydroxide solution) at 25° C. Small plastic tub desiccators may be used, but must be sealed well with no more than 12 cells in any one desiccator—the cells should not come any higher than the seal between the top and the bottom of the desiccator.

After 7-10 days cultures are checked for mite activity, eggs, larvae and protonymphs. Any samples where mite numbers are dramatically reduced are monitored more regularly and mites removed and cultured in small groups in individual glass cells. Further introductions of batches of 30-50 mites is made regularly. If there is no apparent decrease in mite numbers after 7 days, samples are then checked every 2-3 days until 14 days have passed at which point samples are checked twice a week if possible but more recent samples then take precedence. Samples are checked for up to a month following the initial observation period (i.e. 40 days from first inspection) at which point they may be discarded or stored in a freezer.

5) Pathology

Any of the following may indicate the presence of a mite pathogen:

changes in colour: a darkening or complete colour change in the dead mite changes in the cuticle and a bloated appearance prior to and/or after death dead mites attached to the substrate by the anus or mouthparts (some individual mites naturally die attached by the anus to a substrate so it may be difficult to dissociate this from a pathogen infection)

dead mites are flaccid and/or full of liquid that is exuded from the anus legs are extended and rigid rather than curled under the body spores are present as a dusty appearance on the outside of the dead mite but which are distinct from decay agents colonising the mite body only after death changes in size, or activity or developmental times Mites which show pathological changes are examined further, and are subdivided into groups for analysis and inoculation into fresh mite cultures, followed by further analysis:

Viral Acaricides

Identification of viruses is carried out by transmission electron microscopy. Up to 20 mites are homogenised in 0.05 ml of de-ionised water using a pellet mixer. The homogenate is centrifuged under low speed centrifugation at 2000 g for 2 minutes. 5 µl of supernatant and 5 µl of 2% potassium phosphotungstate, uranyl acetate, or other negative stain are placed together on a piece of parafilm in a large Petri dish. A carbon coated copper grid is floated on the drop for 5 minutes and then allowed to air dry for a further 20 minutes. Grids are examined under the TEM (magnification 32,000 to 64,000×) to identify virus particles.

For evaluation of transmission, mites are introduced into culture with two uninfected mites per sick mite, in culture cells as noted above. Cultures are then monitored, again as noted above, for the appearance of pathological effects. Where such effects are apparent mite material is prepared by homogenisation in Hanks Balanced Salt Solution (HBSS). Homogenates are then divided, and aliquots stored in gas-phase above liquid nitrogen in order to provide reference material.

The remainder of the homogenate is clarified by centrifugation at 15000×g for 20 min, then homogenates are pelleted by centrifugation at 130,000×g for 3 hours. Pellets prepared from homogenates are further purified by centrifugation on a linear 15-30% sucrose gradient at 135 000×g for 2.5 hours. Gradients are examined for the presence of virus containing bands, then harvested in 0.5 ml fractions. The optical density of fractions is determined by spectrophotometry at 254 nm to enable identification of viruses present at levels below the limit of visual detection. Additionally, each fraction is examined by electron microscopy (negative staining on EM grids as noted above) for the presence of virus particles. Nucleic acid is isolated from viruses by standard procedures, then further characterised by sequencing or by digestion with DNase, RNase, and mung bean nuclease. This experimental procedure is derived from that used to isolate viruses from other arthropods.

Delivery systems and the stability of the agent are evaluated and a stable form of the agent prepared for administration as noted below. This is exemplified by formulation as a dry powder or microencapsulated form, but the agent may be prepared as a liquid, paste, or solid for immediate or prolonged release.

Production of the agent from cell culture systems (see below) minimises any allergenic effects of the delivery vehicle, and is used along with or instead of production of material derived from colonies of infected mites. In the latter case the allergen content may be reduced by separation techniques such as centrifugation, by starvation of mites prior to harvest, and/or by immunological extraction of Der and other specified proteins using standard techniques.

Specificity is evaluated using a range of mites and other species, with evaluation of both direct effects and allergenicity. The final stage of this work may involve safety testing in environments with human volunteers.

The viral acaricide is exemplified by an occluding baculovirus, since such viruses are environmentally stable, but other types of virus may also be developed, including (but not limited to) non-occluding baculoviruses, reoviruses or reovirus-like agents.

Mite Cell Culture

Mites to be used for culture are washed in sterile water and/or treated with germicidal (254 nm) UV irradiation to minimise carryover of environmental contaminants.

Cultures of mite cells are established using macerated house dust mites as source material. These are inoculated into selected media optimized for insect cells (20). These include Mitsuhashi and Maramorosch Insect medium with lactalbumin hydrolysate (0.65%) and yeastolate (0.5%), 80%; fetal bovine serum, 20% (as used for *Aedes albopictus* (mosquito) cell lines) and Grace's Insect Medium with L-glutamine plus 500 mg/L calcium chloride, 2800 mg/L potassium chloride, 3330 mg/L lactalbumin hydrolysate, 3330 mg/L yeastolate supplemented with 10% heat-inactivated insect cell culture tested fetal bovine serum (as used for *Spodoptera frugiperda* (fall armyworm) cell line Sf9). All media should be supplemented with a standard antibiotic solution for tissue culture use (e.g. 0.01% streptomycin sulphate/0.006% penicillin-G) to prevent bacterial growth.

Cells are cultured in disposable plastic cell culture flasks at 22-28° C., and are cultured so the growing surface is covered. Cell types are identified by microscopy and cells are then passaged by mechanical agitation or digestion at 37° C. with trypsin (0.25% in balanced salt solution).

Aliquots are frozen in growth medium supplemented with 19% sterile DMSO then stored over liquid nitrogen. Subcultures are prepared. Cell types are identified by microscopy, and the resultant cell cultures are used for the growth and propagation of isolated viral agents.

Bacterial Acaricides

Agents causing disease in mites are isolated using centrifugation and/or filtration techniques. No selection for specific types of bacteria is used since it is important that no potential agents be missed.

Material prepared from mites or mite cells killed in previous assays is re-inoculated into fresh mite cultures. Where mites are killed by the re-infection, extracts are prepared and examined by high power light microscopy and low power electron microscopy for the presence of identifiable bacteria. Further purification of extracts by centrifugation yields semi-purified extracts which can be reassessed, and from which stocks of the agent can be prepared on suitable gel media and in liquid cultures. Bacterial agents difficult to grow under such conditions are cultured in live mites using conditions as noted above.

Bacteria isolated by these methods are typed by standard taxonomical techniques including staining, morphological analysis and nucleic acid sequencing. The invention is restricted to agents which establish a viable and transmissible infection in house dust mites, and thus does not include any variant of *Bacillus thuringiensis* (or related agents such as *Bacillus popillae*) where killing is mediated by a crystalline toxin causing gut damage and resultant septicemia.

Purified extracts showing control of house dust mites may be subjected to a range of validation tests including repeat mite toxicity testing, environmental stability, and consistency of response.

Mite killing by the agent is investigated under a range of conditions, and optimised by selective breeding where required. These studies may use conditions replicating areas where the biological acaricide is intended to be used, including the interior of pillows and mattresses, as well as carpets and fabrics.

Delivery systems and the stability of the agent are evaluated and a stable form of the agent prepared for administration as noted below.

Production of the agent from mite-free culture systems is used to minimise any allergenic effects of the delivery vehicle. However, if individual bacteria prove difficult to culture, material derived from colonies of infected mites may be used. In the latter case the allergen content may be reduced by separation techniques such as centrifugation, by starvation of mites prior to harvest, and/or by immunological extraction of Der and other specified proteins using standard techniques.

Specificity is evaluated using a range of mites and other species, with evaluation of both direct effects and allergenicity. The final stage of this work may involve safety testing in environments with human volunteers.

Protozoal or Fungal Acaricides

Material prepared from mites killed in previous assays is re-inoculated into fresh mite cultures. Where mites are killed by the re-infection, extracts are prepared and examined by light microscopy for the presence of identifiable agents. Further purification of extracts by centrifugation yields semi-purified extracts which can be reassessed, and from which stocks of the agent can be prepared in suitable culture systems, which may include live mites, since many such agents grow very poorly outside the host mite.

Agents isolated by these methods are typed by standard taxonomical techniques including morphological analysis and microsequencing.

Purified extracts showing control of house dust mites are subjected to a range of validation tests including repeat mite toxicity testing, environmental stability, and consistency of response.

Mite killing by the agent is investigated under a range of conditions, and optimised by selective breeding where required. These studies use conditions replicating areas where the biological acaricide is intended to be used, including the interior of pillows and mattresses, as well as carpets and fabrics.

Delivery systems and the stability of the agent are evaluated and a stable form of the agent are prepared for administration as noted below.

Production of the agent from mite-free culture systems is optimal to minimise any allergenic effects of the delivery vehicle. However, if individual agents prove difficult to culture, material derived from colonies of infected mites may be used. In the latter case the allergen content may be reduced by separation techniques such as centrifugation, by starvation of mites prior to harvest, and/or by immunological extraction of Der and other specified proteins using standard techniques.

Specificity is evaluated using a range of mites and other species, with evaluation of both direct effects and allergenicity. The final stage of this work involves safety testing in environments with human volunteers. For protozoal, fungal or nematode agents safety testing is of particular importance since the agents may themselves be allergic.

EXAMPLE 1

Effects of Known Biological Insecticides

Isolates of the entomopathogenic fungi *Beauveria bassiana,* and *Beauveria brongniartii* were collected from diseased insects, characterised, and tested against house dust mites at two concentrations to determine both acaricidal effect and as models for the recovery of potential pathogen using mite culture methods.

Suspensions of fungi were adjusted to give a final concentration of $2.5 \times 10^4$ spores (low dose) or $2.25 \times 10^7$ spores (high dose) per inoculum. Suspensions were then inoculated onto filter papers in the base of mite culture cells, on the upper surface to which mites would be exposed. Nutrient-only control treatments were run in parallel.

Immediately following inoculation of a cell, cultured adult house dust mites (HDM) of a laboratory strain were placed into the cell (25 mites per cell) using a single hair paintbrush, with a small amount of food and the cell sealed with a glass cover which was secured with bull-dog clips. Separate groups of mites were used for each cell to prevent cross-contamination between treatments and all equipment was sterilised in ethanol between treatments. The cells were placed in small plastic dessicators at 25° C. and 90-100% relative humidity.

Figure 1:
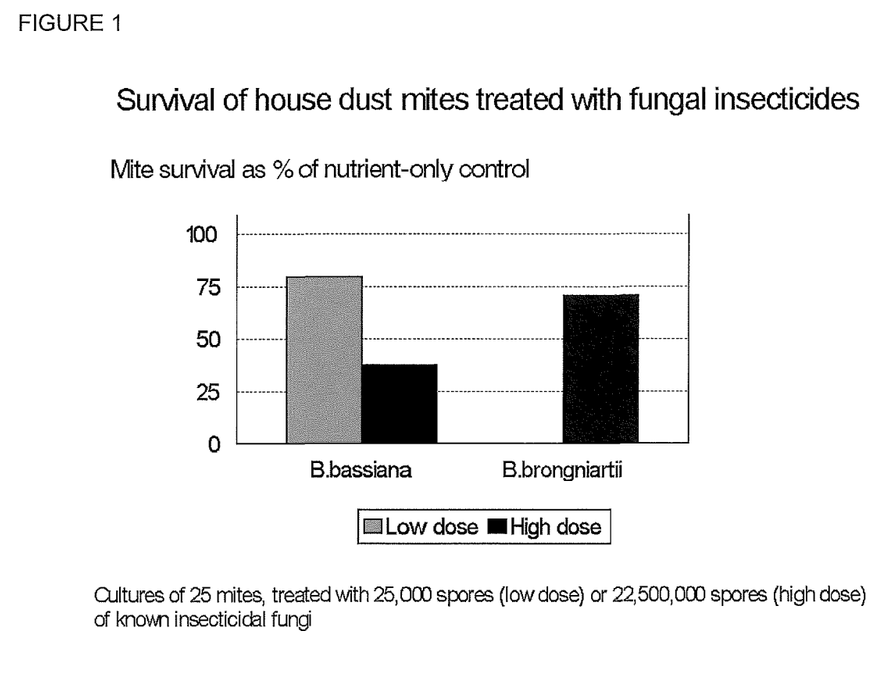
FIG. 1 shows the results of treating house dust mites with the two different fungi acting as fungal insecticides, namely *Beauveria bassiana,* and *Beauveria brongniartii.* The data shows mite survival following treatment with a fungal insecticide as a percentage of a mite-survival in a control group treated with nutrients only. The light grey bar represents data from a low dose of fungal insecticide (25,000 spores) and the black bar represents data from a high dose of fungal insecticide (22,500,000 spores). *B. brongniartii* was tested at a high dose only.

Cultures were examined after 5 days (low dose) or 3 and 6 days (high dose) for mite mortality (FIG. 1).

At low doses, *B. bassiana* showed the greatest effect killing 20% of mites after five days.

Increasing the inoculum to 880,000 spores per mite increased acaricidal activity for *B. bassiana*. *B. brongniartii* was only assayed at the higher dose level. *B. bassiana* again was shown to be the most effective agent, killing 63% of mites after 6 days.

The above results demonstrate that house dust mites show dose-related susceptibility to known entomopathogenic fungi of the genus *Beauveria*, and thus that biological control agents have potential application for control of house dust mites.

Culture of mites killed by these fungi (see Example 2, below) showed that fungal spores were present on the exterior of the mite.

EXAMPLE 2

Demonstration of Recovery of Pathogenic Agents

In experiments with high doses of fungal agents, dead mites were removed from cultures and placed on 1% tap water agar in order to provide a high humidity and favour fungal germination.

Saprophytic fungal growth was noted on cadavers of mites from fungal treatments but none was noted on mites from control treatments. As noted above, entomopathogenic fungi normally invade the host and replicate within it before bursting out through the cuticle and producing spores on the surface of the cadaver. This type of sporulation is characterised by the presence of a dense layer of dusty spores on the cadaver and few, if any, mycelia. Spores that are present on the mite when it dies but are not the cause of death, may germinate after the mite has died and grow as mycelia using the mite as nutrition. This type of growth is characterised by sparse strand-like structures growing loosely over the mite surface. The fact that saprophytic growth was noted indicates that mites did contact and pick up spores using these methods of inoculation.

This series of experiments confirmed that mites in the culture systems used for the bioprospecting study will contact and collect infectious agents present in their environment, and thus that the methods proposed are efficacious in extracting such agents from the culture environment.

EXAMPLE 3

Identification of Pathogen from Dust Samples 134 samples of environmental material were assayed for the presence of acaricidal agents using mite culture methods. These consisted of the following:

60 samples of dust from carpets in houses which had previous records of dust mite infestations (or the correct humidity and temperature conditions to support dust mite infestations).

28 household samples were collected locally using a mobile sampling kit (specially prepared vacuum cleaner which had a filter inserted for mite capture). Of those 28 samples, 14 were sampled from mattresses and 14 from carpets.

10 samples from sheep bedding, obtained locally. These samples often contained predatory mites which would kill dust mites exposed to the samples.

36 samples supplied from U.S. sources; 18 were obtained from carpets and 18 from mattresses.

A sample of house dust was collected from a local domestic environment. This sample showed no evidence of mite activity on initial inspection and was transferred to single cells. Mites were added from the laboratory culture (30 adult house dust mites, from a laboratory strain) 13 days after collection. Sick mites were identified 10 days after inoculation. These mites appeared sluggish and slow moving. They were bloated with a dull appearance to the cuticle as if it were deformed or coated. These mites were transferred to individual, small cells.

Three days later, 50% of the "sick" mites had died, showing unusual features on the mite surface. Washing caused disintegration, demonstrating reduced structural integrity.

Figure 2:
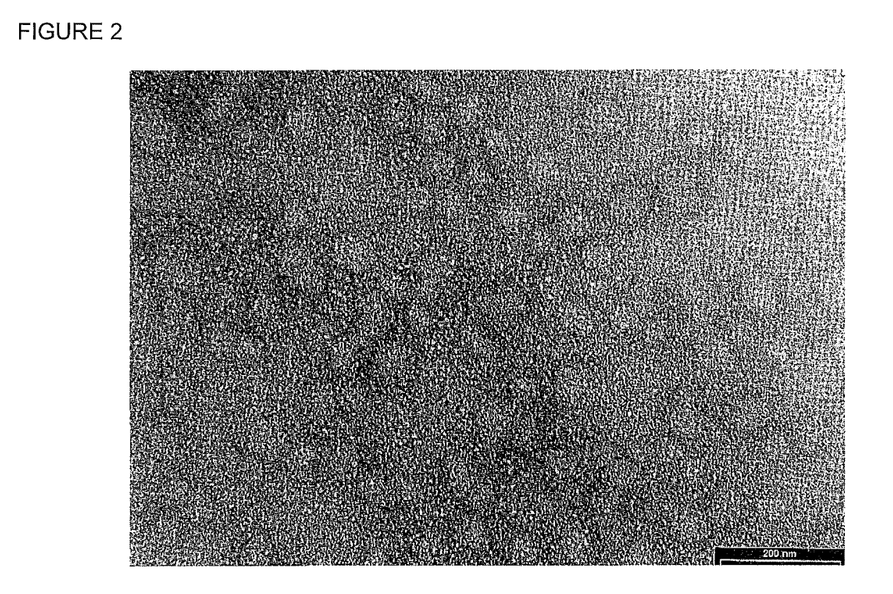
FIG. 2 shows particles observed by electron microscopy (stained with uranyl acetate) in extracts from diseased mite material. Particles average 75 nm in diameter.

The remains of the washings and mite material were examined using transmission electron microscopy. Mite material was macerated in 1.5 ml of uranyl acetate (2%) and a carbon coated copper grid floated on the droplet for 5 minutes. The grid was allowed to air dry for 20 minutes and then examined under ×36,000-64,000 magnification. Regular particles were observed which stained with uranyl acetate. These averaged 75 nm in diameter (approximately), which lies within the size range expected for viruses (FIG. 2).

On the basis of size and staining properties as well as the pathological effects produced, the sample of house dust exemplifies the isolation of a biological control agent (i.e. an acaricidal infectious agent) for the house dust mite from a domestic sample.

The mite killing as observed demonstrates the production of pathological effects in mites from inoculation with one of 134 samples, this sample being of house dust collected from a readily accessible source.

EXAMPLE 4

Identification of Pathogen from a Collapsed Mite Colony

In an example of the potential for alternative sources of infectious agents, a previously healthy colony culture of *Dermatophagoides farinae* was observed to be decreasing in number, with mites exhibiting unusually reduced levels of motility. Over the course of approximately one month the colony continued to decrease to the point where very few live adult mites were visible.

After approximately two weeks the remaining colony culture was removed from its dessicator and placed in a sealed polybag at +4° C. The dessicator was cleaned using 70% ethanol and a replacement colony seeded from stocks held in a separate insectary. Due to the apparent fungal nature of the agent, and with the knowledge that fungi exhibit cross-specific activity, the stored colony material was subsequently used in a preliminary inoculation experiment in order to determine any pathogenic effect of the fungal agent on healthy mites of a different species.

For this experiment, four groups of approximately 25 healthy adult or final-stage immature (i.e. tritonymph) *D. pteronyssinus* were transferred from healthy colony stocks into 4 new, standard 8 cm×8 cm cells.

Approximately 0.05 g of the colony collapse culture was added using a clean spatula to each of the three cells of each species. Prior to use, the culture was allowed to equilibrate to room temperature for approximately one hour and was subsequently observed under a stereomicroscope for the presence of live mites; none were visible (some dead mites were visible). Approximately 0.05 g of fresh food (a standard, pre-prepared 3:1 yeast/flour mixture) was added using a clean spatula to the remaining cell from each species to serve as a control.

The cells were placed glass-upwards into two dessicators (one for each species) at ambient temperature (22-25° C.) and approximately 75% relative humidity, and observed every few days for signs of morbidity and mortality for a total of one month. 20 days post-inoculation, surviving mites were counted from each cell by holding the cells 15-20 cm above a hot lamp for 2-3 minutes which drove them onto a black adhesive sheet of vinyl placed across the top of the cell (replacing the glass).

An overall decrease in the number of live adult mites present in the cells over the observation period was observed, while the *D. pteronyssinus* control increased by one adult mite. *D. pteronyssinus* showed a decrease in adult numbers of 36-52% compared to the control cell (Table 1).

Figure 3:
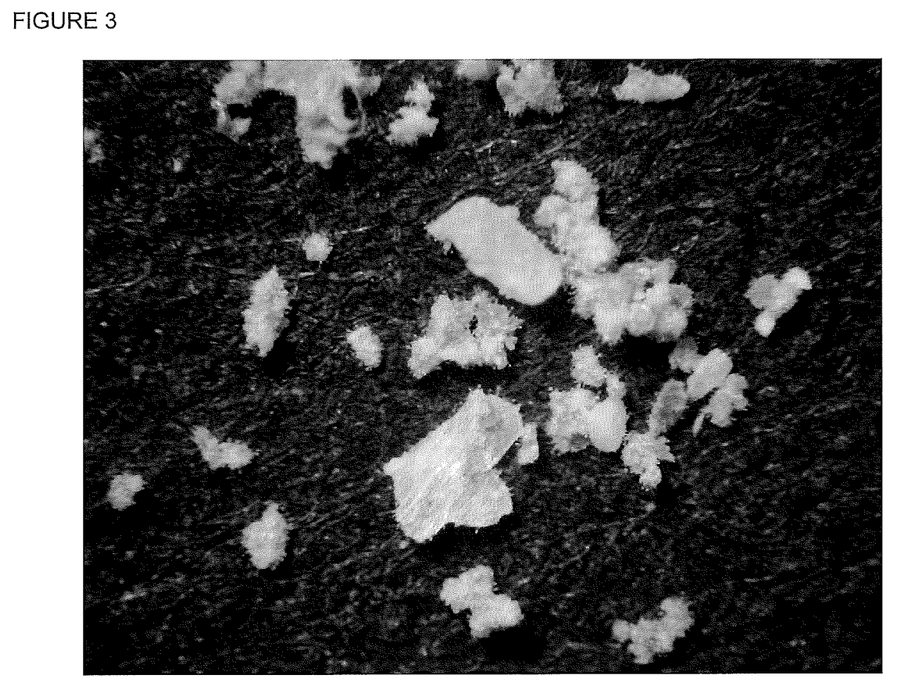
FIG. 3 shows white, powder-like fungal hyphae present on foodstuff in mite culture.
Figure 4:
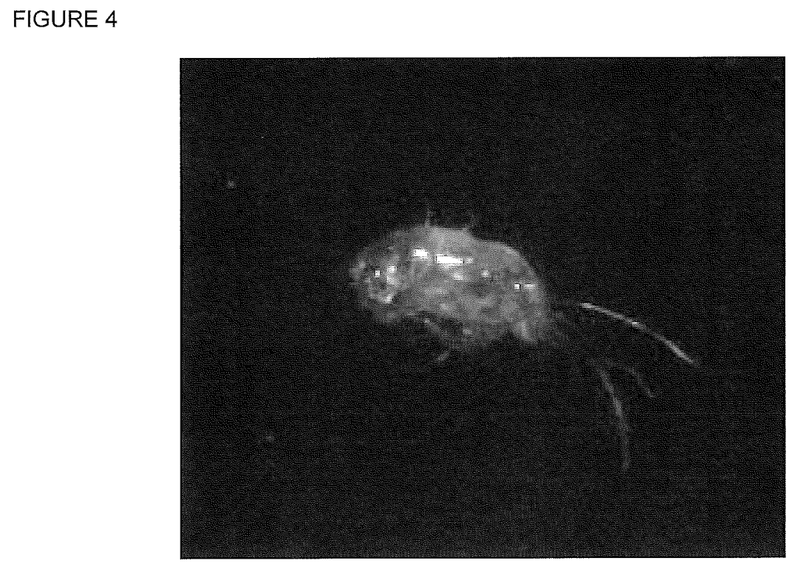
FIG. 4 shows a dead *D. pteronyssinus* stuck to the glass surface of an inoculated cell.

Mites in the control cell appeared to be healthy throughout the experiment, with no evidence of fungal growth on mites or on the culture medium (foodstuff). After two weeks some evidence of fungal growth was evident in all inoculated cells. The fungus presented as a powder-like whitening of the culture medium with only small hyphae visible (FIG. 3). Growth appeared to be restricted to only the medium and did not physically impede mite movement. Some mites in experimentally inoculated cells of both species appeared sluggish (reduced motility across the glass top of the cell in particular). Additionally, some mites in the inoculated cells died stuck to the surface of the glass, with a visible white, powder-like substance on and around the mite (FIG. 4).

TABLE 1

*D. pteronyssinus* experimental cell counts

| Treatment | Starting count (approx.) | Final count, adults | % change |
| --- | --- | --- | --- |
| Control | 25 | 26 | +4% |
| Inoculated 1 | 25 | 12 | −52% |
| Inoculated 2 | 25 | 16 | −36% |
| Inoculated 3 | 25 | 14 | −44% |

In conclusion, the acaricidal infectious agent presented as a fungus, which appeared to cause morbidity, manifesting as reduced motility of some individuals, in experimentally inoculated cells. Slow-moving and dead were visible on the glass surface of the inoculated cells, and numbers of adult mites were decreased by an average of 46% compared to the control.

Clauses

1) A method of treating or preventing house dust mite infestations by applying a biological control product in an appropriate formulation containing an infectious agent, said agent to be capable of producing an acaricidal effect by establishing a transmissible infection of house dust mites at or proximal to the site of such infestations.
2) A method of treating or preventing house dust mite infestations by applying a biological control product containing two or more infectious agents, said agents to be capable of producing an acaricidal effect by establishing a transmissible infection at or proximal to the site of such infestations.
3) A method of treating or preventing house dust mite infestations by applying a biological control product according to clause 1 or clause 2 which infects two or more species of house dust mite selected from known species exemplified by (but not limited to) *Dermatophagoides pteronissynus, Dermatophagoides farinae* or *Euroglyphus maynei*.
4) A biological control product according to clauses 1, 2 or 3 containing an agent with acaricidal properties where the agent of that infection is a virus, which may be a member of the family Baculoviridae or any other virus infecting mites.
5) A biological control product according to clauses 1, 2 or 3 containing an agent of a naturally occurring infection of mites where the agent of that infection is a bacterium, other than *Bacillus thuringiensis* and its variants acting by the effects of a toxin which are excluded from the clause since these do not establish a transmissible infection.
6) A biological control product according to clauses 1, 2 or 3 containing an agent of a naturally occurring infection of mites where the agent of that infection is a fungus, which may be a fungus of the genus *Beauveria, Microspora* or any other fungal infection of mites.
7) A biological control product according to clauses 1, 2 or 3 containing an agent of a naturally occurring infection of mites where the agent of that infection is a protozoan.
8) A method of using an agent according to clause 1, 2 or 3 with components according to clauses 4, 5, 6 or 7 (or combinations thereof) where the product is applied in a domestic setting as a treatment for any condition caused or exacerbated by mite-derived allergens, including (but not limited to) asthma, allergic rhinitis, dermatitis or eczema
9) A method of using an agent according to clause 1, 2 or 3 with components according to clauses 4, 5, 6 or 7 (or combinations thereof) where the product is applied in a domestic setting as a means of preventing sensitisation to mite allergens.
10) A method of using an agent according to clause 1, 2 or 3 with components according to clauses 4, 5, 6 or 7 (or combinations thereof) in a commercial, industrial or medical setting as a treatment for any condition caused or exacerbated by mite-derived allergens, including (but not limited to) asthma, allergic rhinitis or eczema.
11) A method of using an agent according to clause 1, 2 or 3 with components according to clauses 4, 5, 6 or 7 (or combinations thereof) in a commercial, industrial or medical setting as a means of preventing sensitisation to mite allergens.
12) A method comprising the adaptation or selective breeding of an agent or agents as specified in any of clauses 4-7 to optimise its efficacy as an acaricide or to counter the development of resistance by the house dust mite by isolation and selection from naturally occurring variant forms of the agent isolated from environmental sources or from resistant or other mites.
13) A method comprising the mutation or adaptation of an agent or agents as specified in any of clauses 4-7 to optimise efficacy as an acaricide or to counter the development of resistance by house dust mites by the use of nitrous acid, ultraviolet light, or other mutagenic agent or agents.
14) The use of a product as specified in clauses 1, 2 or 3 containing an agent or agents as specified in any of clauses 4-7 in a stable dry powder formulation (including microencapsulated forms) for treatment of mite habitats including (but not limited to) bedding, pillows, carpets, curtains, upholstery and soft furnishings by sprinkling, injection of powder, or by other means.
15) The use of a product as specified in clauses 1, 2 or 3 containing an agent or agents as specified in any of clauses 4-7 in a formulation of another type including (but not limited to) a liquid, paste or solid, including (but not restricted to) use in a bait station.
16) The use of a product as specified in clauses 1, 2 or 3 containing an agent or agents as specified in any of clauses 4-7 in a formulation of another type including a food material or an attractant suitable for use with mites. The food material may be presented alongside the mite material or may be used to encapsulate it. This may include presentation with or encapsulation of whole infected mite carcasses.

17) The use of a product as specified in clauses 1, 2 or 3 containing an agent or agents as specified in any of clauses 4-7 formulated for slow release over period of time, for example from a solid matrix or by impregnation into fabrics, filling materials, clothing or bedding for the prevention or moderation of infestation of those habitats by mites.

18) The development of a product as specified in clauses 1, 2 or 3 containing an agent or agents as specified in any of clauses 4-7 by screening material from mites and mite extracts for naturally occurring pathogens or disease-causing organisms using mite colonies or cultured mite cells, and optimising the acaricidal effect thereof in such systems.

19) The invention as substantially hereinbefore described.

Various modifications and variations of the described methods and system of the present invention will be apparent to those skilled in the art without departing from the scope and spirit of the present invention. Although the present invention has been described in connection with specific preferred embodiments, it should be understood that the invention as claimed should not be unduly limited to such specific embodiments. Indeed, various modifications of the described modes for carrying out the invention which are obvious to those skilled in biochemistry and biotechnology or related fields are intended to be within the scope of the following claims.

The invention claimed is:

1. A method of treating or preventing a house dust mite infestation, said method comprising applying a fungal acaricidal infectious agent at a site of a house dust mite infestation, or at a site proximal thereto, or at a site at risk of such infestation, wherein said fungal acaricidal infectious agent is capable of transmissible infection by replication and amplification of the agent in or on said house dust mite and is thus both structurally and functionally distinct from chemical and bacterial acaricidal agents that are incapable of infection and replication in or on said house dust mite, wherein the fungal acaricidal infectious agent is applied to fabrics, bedding, upholstered materials, padded furnishings, soft toys, carpets, curtains, filling materials, clothing, soft furnishings or combinations thereof.

2. The method according to claim 1 comprising the application of two or more fungal acaricidal infectious agents.

3. The method according to claim 1, wherein the house dust mite is one or more selected from the following genera: *Dermatophagoides, Euroglyphus* or combinations thereof.

4. The method according to claim 1, wherein the house dust mite is one or more selected from the following species: *Dermatophagoides pteronyssinus, Dermatophagoides farinae, Dermatophagoides microceras, Dermatophagoides siboney*, and *Euroglyphus maynei* or combinations thereof.

5. The method according to claim 1, wherein the fungal acaricidal infectious agent is of the genus *Beauveria, Microspora*, or combinations thereof.

6. The method according to claim 1, wherein the fungal acaricidal infectious agent is of the species *Beauveria bassiana, Beauveria brongniartii* or combinations thereof.

7. The method according to claim 1, wherein the fungal acaricidal infectious agent infects two or more species of house dust mite.

* * * * *